US008054860B2

(12) United States Patent
Zhang

(10) Patent No.: US 8,054,860 B2

(45) Date of Patent: Nov. 8, 2011

(54) METHOD, SYSTEM AND APPARATUS FOR SYNCHRONIZING TIME IN TIME-DIVISION MULTIPLEXING SYSTEM

(75) Inventor: Qing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 12/496,277

(22) Filed: Jul. 1, 2009

(65) Prior Publication Data

US 2009/0268758 A1 Oct. 29, 2009

Related U.S. Application Data

(63) Continuation of application No. PCT/CN2008/072861, filed on Oct. 28, 2008.

(30) Foreign Application Priority Data

Nov. 14, 2007 (CN) .......................... 2007 1 0169682

(51) Int. Cl.
*H04J 3/06* (2006.01)
*H04B 7/212* (2006.01)

(52) U.S. Cl. ....................................... 370/503; 370/324

(58) Field of Classification Search .................. 370/503, 370/509–510, 512, 321, 324; 37/503, 321, 37/324, 508–510, 329–330
See application file for complete search history.

(56) References Cited

U.S. PATENT DOCUMENTS

| | | | | |
|---|---|---|---|---|
| 5,920,557 | A * | 7/1999 | Hirata | 370/350 |
| 6,278,699 | B1 * | 8/2001 | Atarius | 370/324 |
| 6,597,681 | B1 * | 7/2003 | Conner | 370/347 |
| 6,647,026 | B1 * | 11/2003 | Tanaka | 370/509 |
| 6,850,501 | B1 * | 2/2005 | Sebire | 370/329 |
| 7,403,489 | B2 * | 7/2008 | Ohtani et al. | 370/252 |
| 2003/0162549 | A1 * | 8/2003 | Carlsson | 455/456 |
| 2007/0053372 | A1 * | 3/2007 | Liu et al. | 370/406 |
| 2007/0201591 | A1 * | 8/2007 | Knerr et al. | 375/365 |

* cited by examiner

*Primary Examiner* — Kwang B Yao
*Assistant Examiner* — Candal Elpenord
(74) *Attorney, Agent, or Firm* — Finnegan, Henderson, Farabow, Garrett & Dunner LLP

(57) ABSTRACT

A method, system and apparatus for synchronizing time in a time-division multiplexing (TDM) system are disclosed. The method may include: receiving time synchronization information carried in an idle timeslot, where the idle timeslot is in a multiframe of an E1 signal or T1 signal; and synchronizing time according to the time synchronization information carried in the timeslot. The present disclosure may synchronize the time of the communication device in the TDM system while saving the cost, eliminating the necessity of installation and improving the stability of the time synchronization.

10 Claims, 4 Drawing Sheets

| | Sub-multiframe | Frame number | Bit 1 to bit 8 of the frame | | | | | | | |
|---|---|---|---|---|---|---|---|---|---|---|
| | | | 1 | 2 | 3 | 4 | 5 | 6 | 7 | 8 |
| Multiframe | I | 0 | $C_1$ | 0 | 0 | 1 | 1 | 0 | 1 | 1 |
| | | 1 | 0 | 1 | A | $S_{a4}$ | $S_{a5}$ | $S_{a61}$ | $S_{a7}$ | $S_{a8}$ |
| | | 2 | $C_2$ | 0 | 0 | 1 | 1 | 0 | 1 | 1 |
| | | 3 | 0 | 1 | A | $S_{a4}$ | $S_{a5}$ | $S_{a62}$ | $S_{a7}$ | $S_{a8}$ |
| | | 4 | $C_3$ | 0 | 0 | 1 | 1 | 0 | 1 | 1 |
| | | 5 | 1 | 1 | A | $S_{a4}$ | $S_{a5}$ | $S_{a63}$ | $S_{a7}$ | $S_{a8}$ |
| | | 6 | $C_4$ | 0 | 0 | 1 | 1 | 0 | 1 | 1 |
| | | 7 | 0 | 1 | A | $S_{a4}$ | $S_{a5}$ | $S_{a64}$ | $S_{a7}$ | $S_{a8}$ |
| | II | 8 | $C_1$ | 0 | 0 | 1 | 1 | 0 | 1 | 1 |
| | | 9 | 1 | 1 | A | $S_{a4}$ | $S_{a5}$ | $S_{a61}$ | $S_{a7}$ | $S_{a8}$ |
| | | 10 | $C_2$ | 0 | 0 | 1 | 1 | 0 | 1 | 1 |
| | | 11 | 1 | 1 | A | $S_{a4}$ | $S_{a5}$ | $S_{a62}$ | $S_{a7}$ | $S_{a8}$ |
| | | 12 | $C_3$ | 0 | 0 | 1 | 1 | 0 | 1 | 1 |
| | | 13 | E* | 1 | A | $S_{a4}$ | $S_{a5}$ | $S_{a63}$ | $S_{a7}$ | $S_{a8}$ |
| | | 14 | $C_4$ | 0 | 0 | 1 | 1 | 0 | 1 | 1 |
| | | 15 | E* | 1 | A | $S_{a4}$ | $S_{a5}$ | $S_{a64}$ | $S_{a7}$ | $S_{a8}$ |
FIG. 3
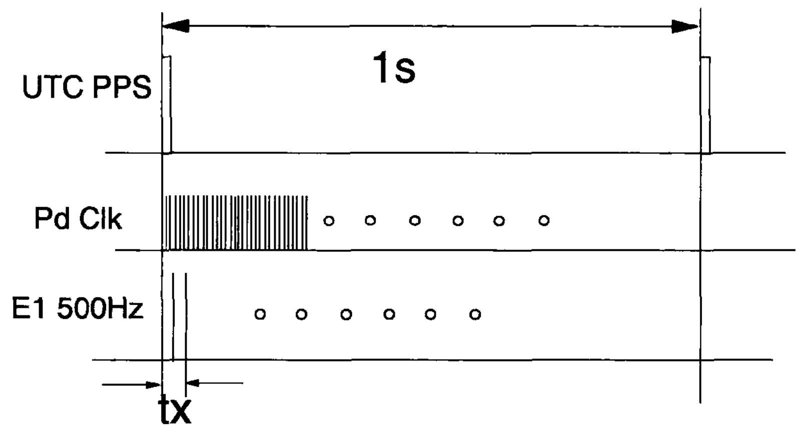
FIG. 4
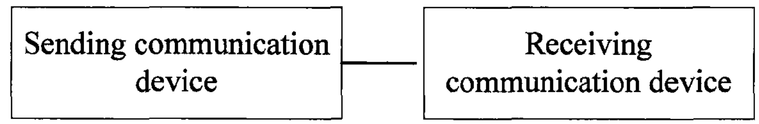
FIG. 5

METHOD, SYSTEM AND APPARATUS FOR SYNCHRONIZING TIME IN TIME-DIVISION MULTIPLEXING SYSTEM

This application is a continuation of international patent application No. PCT/CN2008/072861, filed Oct. 28, 2008, entitled "Method, System and Apparatus for Synchronizing Time in Time-Division Multiplexing System," which claims priority to Chinese patent application No. 200710169682.9, filed with the Chinese Patent Office on Nov. 14, 2007, and entitled "Method, System and Apparatus for Synchronizing Time in Time-Division Multiplexing System," both of which are incorporated herein by reference in their entirety.

FIELD OF THE INVENTION

The present disclosure relates to a time-division multiplexing (TDM) system, and in particular, to a method, system and apparatus for synchronizing time in the TDM system.

BACKGROUND OF THE INVENTION

With the development of communication technologies, two data transmission technologies are emerging. One is frequency-division multiplexing (FDM) technology, which may be used in wide code division multiple access (WCDMA) and code division multiple access (CDMA) systems; the other is TDM technology, which may be used in a time division-synchronous code division multiple access (TD-SCDMA) system.

To transmit data with the TDM technology, both communication parties need to perform accurate time synchronization to ensure that the receiver can receive a timeslot carrying the data from the sender and obtain the carried data by parsing the timeslot.

Currently, communication devices in the TDM system use a method involving global positioning system (GPS) to perform accurate time synchronization. As shown in FIG. 1, the communication system may include a communication device, a GPS antenna and a communication satellite. The process is as follows: An apparatus for receiving GPS time signals is installed in the communication device; the apparatus for receiving GPS time signals interacts with the communication satellite through the GPS antenna when time synchronization is required; the communication satellite provides the current time and sends the current time to the apparatus for receiving GPS time signals through the GPS antenna. Thus, time synchronization can be guaranteed when the communication device receives and transmits data in the TDM system.

However, when the GPS method is used to synchronize time for the communication device in the TDM system, the apparatus for receiving GPS time signals may need to be installed in the communication device. This apparatus may include a receiving module for receiving the current time, an antenna for capturing communication satellite signals, and a protecting device for protection. In addition, the GPS method may involve settings of all the communication devices in the TDM system. Furthermore, the site selection for installing the GPS antenna of the TDM system is complex and requires rich engineering experience. When the terrain in an area is complex, improper site selection for the GPS antenna may cause unstable operations of the GPS system. In some cases, the GPS system cannot provide the communication devices in the area with the current time, and the system may fail to synchronize.

SUMMARY OF THE INVENTION

Embodiments of the present disclosure provide a method, system and apparatus for synchronizing time in a TDM system.

A method for synchronizing time in a TDM system is provided in an embodiment of the present disclosure. The method may include: receiving time synchronization information carried in an idle timeslot, which is in a multiframe of an E1 signal or T1 signal; and synchronizing time according to the time synchronization information carried in the timeslot.

A system for synchronizing time in a TDM system is provided in an embodiment of the present disclosure. The system may include a sending communication device and a receiving communication device.

The sending communication device may be configured to carry time synchronization information in an idle timeslot and send the timeslot to the receiving communication device. The idle timeslot may be in a multiframe of an E1 signal or T1 signal.

The receiving communication device may be configured to receive the time synchronization information carried in the idle timeslot and synchronize time according to the time synchronization information.

A sending apparatus for synchronizing time in a TDM system is provided in an embodiment of the present disclosure. The sending apparatus may include a generating module and a sending module.

The generating module may be configured to carry time synchronization information in an idle timeslot and send the timeslot to the sending module. The idle timeslot may be in a multiframe of an E1 signal or T1 signal.

The sending module may be configured to carry the time synchronization information in the idle timeslot and send the timeslot to the receiving communication device.

A receiving apparatus for synchronizing time in a TDM system is provided in an embodiment of the present disclosure. The receiving apparatus may include a receiving module and a time synchronizing module.

The receiving module may be configured to receive time synchronization information carried in an idle timeslot from a sending communication device and send the received time synchronization information to the time synchronizing module. The idle timeslot may be in a multiframe of an E1 signal or T1 signal.

The time synchronizing module may be configured to synchronize time according to the time synchronization information.

In some exemplary embodiments of the present disclosure, the sending communication device may carry the time synchronization information in an idle timeslot, and send the timeslot to the receiving communication device; the receiving communication device may adjust its own time according to the received time synchronization information carried in the idle timeslot to synchronize with the time of the sending communication device. Such embodiments may not require a GPS antenna or an apparatus for receiving GPS time signals in the communication device. In addition, the time synchronization process may be less affected by the terrain in the area where the communication device is located, which improves the stability of the time synchronization.

BRIEF DESCRIPTION OF THE DRAWINGS

FIG. 3 shows a structure of an E1 signal by using a source specific multicast (SSM) coding mode;

FIG. 4 shows a process of obtaining the phase deviation of an initial multiframe by using a phase discrimination technology;

FIG. 5 shows a system for synchronizing time in the TDM system in an embodiment of the present disclosure;

FIG. 7 (B) shows a receiving module of a first implementation mode of the receiving apparatus for synchronizing time in the TDM system in an embodiment of the present disclosure; and FIG. 7 (C) shows a receiving module of a second implementation mode of the receiving apparatus for synchronizing time in the TDM system in an embodiment of the present disclosure.

DETAILED DESCRIPTION OF THE DISCLOSURE

The present disclosure is described in detail with reference to the accompanying drawings and exemplary embodiments.

To synchronize the time of the communication device in the TDM system, the sending communication device may carry the time synchronization information in an idle timeslot and send the timeslot to the receiving communication device. The receiving communication device may adjust its own time according to the received time synchronization information carried in the idle timeslot to synchronize with the time of the sending communication device. The sending communication device may transmit data to the receiving communication device after both communication parties synchronize the time.

In embodiments where the TDM system uses an E1 signal or T1 signal to carry data, an idle bit in timeslot TS0 of a multiframe of the E1 signal or T1 signal may be used to transmit the time synchronization information. Other idle timeslots of the multiframe of the E1 signal or T1 signal may also be used without departing from the scope of the present disclosure.

Figure 1:
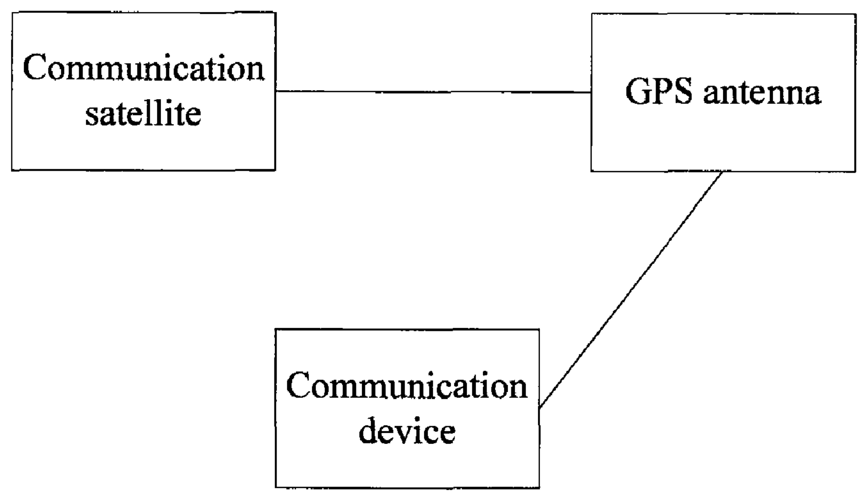
FIG. 1 shows a network where a global positioning system (GPS) is used to synchronize the time of a communication device in a TDM system in the related art.
Figure 2:
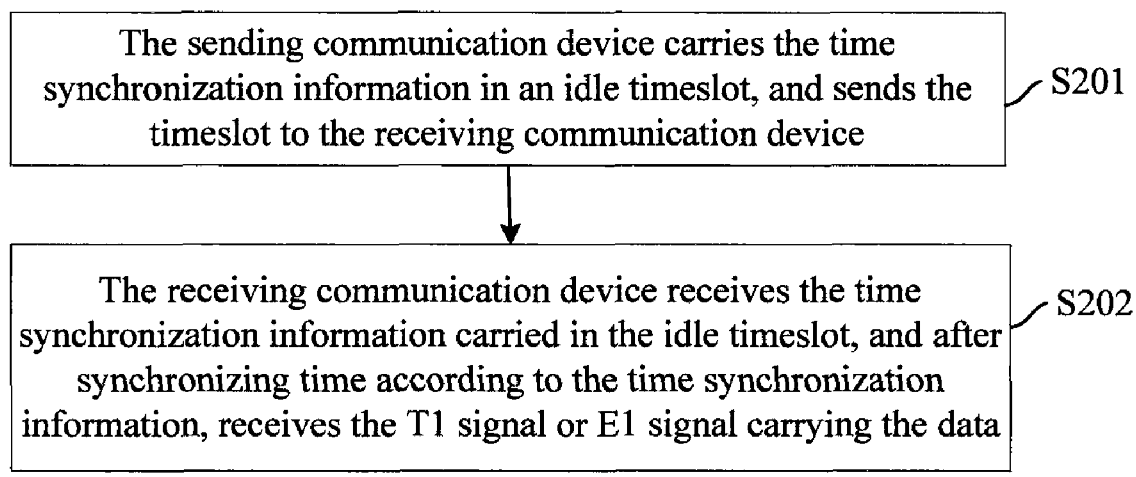
FIG. 2 is a flowchart of a method for synchronizing time in the TDM system in an embodiment of the present disclosure.

FIG. 2 is a flowchart of a method for synchronizing time in the TDM system in an embodiment of the present disclosure. The method may include the following steps:

S201. The sending communication device may carry the time synchronization information in an idle timeslot, and sends the timeslot to the receiving communication device.

The time synchronization information may be carried in TS0 or one or more other idle timeslots of the multiframe or T1 signal or E1 signal carrying the data.

Then, the sending communication device sends the T1 signal or E1 signal carrying the data.

S202. The receiving communication device may receive the time synchronization information carried in the idle timeslot. After synchronizing the time according to the time synchronization information, the receiving communication device may receive the T1 signal or E1 signal carrying the data.

In the process shown in FIG. 2, the time synchronization information carried in the idle timeslot may include current absolute time, which may be carried in a format of year-month-day-hour-minute-second. Alternative formats may be used without departing from the scope of the present invention.

In some exemplary embodiments of the present disclosure, the sending communication device may also obtain a phase deviation between an initial multiframe of the E1 signal or T1 signal carrying the data and the absolute time by using the phase discrimination technology. The absolute time may be associated with universal time coordinated (UTC) when the initial multiframe arrives. The phase deviation may be sent to the receiving communication device through an idle bit in TS0 of the multiframe of the E1 signal or T1 signal, or through one or more other idle timeslots of the multiframe. The phase deviation may also be carried in the time synchronization information for transmission. Thus, the receiving communication device may obtain the current absolute time and the time to be synchronized with the sending communication device according to the current absolute time and phase deviation included in the received time synchronization information.

In embodiments of the present disclosure, the idle bit in TS0 of the multiframe of the E1 signal or T1 signal may be used to transmit the current absolute time or the current absolute time and the phase deviation that act as the time synchronization information because TS0 does not carry data and may be the first timeslot in the multiframe. After the current absolute time or the current absolute time and the phase deviation in TS0 are received, the communication device may synchronize with the time, and data carried in other timeslots of the multiframe may be properly parsed and obtained.

The following describes the embodiment of the present disclosure by taking the process of time synchronization between the two communication parties according to the current absolute time and phase deviation carried in the idle bit of TS0 of the E1 signal as an example. In this embodiment, the communication parties are a synchronous digital hierarchy (SDH) device and a base station (BS), or a building integrated timing supply (BITS) device and an SDH device in the TDM system. The BITS device may be set in the switching center in the TDM system.

In the TDM system, the E1 signal may use a source specific multicast (SSM) coding mode to prevent frequency synchronization in SDH networking. FIG. 3 shows a structure of the E1 signal that uses the SSM coding mode. As shown in FIG. 3, in bit 4 to bit 8 in TS0 of odd numbers, that is, bit 4 to bit 8 of frame number 1, 3, 5, or 7 in sub-multiframe I or bit 4 to bit 8 of frame number 9, 11, 13 or 15 in sub-multiframe II, five bits are idle. The current absolute time or the phase deviation may be carried in any of the five idle bits. Bit 4 may be used to carry the SSM information in China. Thus, during the implementation, any of bit 4 to bit 8 may be used at random to carry the current absolute time or phase deviation or both.

The current absolute time and/or phase deviation or the current absolute time and phase deviation may occupy a bit. The bit that carries the current absolute time is called a time synchronization bit. The bit that carries the phase deviation is called a phase synchronization bit. During the transmission of time synchronization information, the time synchronization bit and phase synchronization bit may be pre-negotiated between both communication parties, for example, between the SDH device and the BS or between the BITS device and the SDH device. When sending the current absolute time or the current absolute time and phase deviation, the sending communication device may set the current absolute time in the time synchronization bit, or set the current absolute time in the time synchronization bit and the phase deviation in the phase synchronization bit. After receiving the information, the receiving communication device may obtain the current absolute time from the time synchronization bit or obtain the current absolute time and phase deviation from the time synchronization bit and the phase synchronization bit to synchronize time.

In an exemplary embodiment of the present disclosure, the time synchronization bit and phase synchronization bit may identify TS0 or other timeslots in the multiframe of the E1 signal. If the time synchronization bit and phase synchronization bit identify a same timeslot, the time synchronization bit alone may be used to identify that the current absolute time and phase deviation are in the timeslot.

The E1 signal may transmit 500 multiframes in one second. It takes 125 μs to transmit one frame and 2 ms to transmit one multiframe. Thus, the E1 signal may transmit data of 500 bytes in one second. When the absolute time is due, the initial multiframe may need to be identified. This can be done by having the initial multiframe carry an identifier.

In this embodiment, the current absolute time included in the time synchronization information may be the current time of the UTC.

In an exemplary embodiment, if the communication parties are the BITS device and the SDH device, the BITS device may align the initial multiframe and the absolute time and then send them to the SDH device, making it unnecessary to carry the phase deviation in the idle timeslot. After the SDH device receives the current absolute time carried in the idle timeslot and synchronizes the local time, the SDH device may need to receive only the multiframes carrying the data sent after the initial multiframe.

If the communication parties are the SDH device and the BS, the SDH device may use the phase discrimination technology to obtain the phase deviation of the initial multiframe, carry the phase deviation and current absolute time as the time synchronization information in the idle timeslot, and send the timeslot to the BS. The phase discrimination technology means that the SDH device detects the phase deviation of the initial multiframe and obtains the phase deviation at the absolute time of the UTC when the initial multiframe arrives. FIG. 4 shows a process of obtaining the phase deviation of the initial multiframe by using the phase discrimination technology in an embodiment of the present disclosure. As shown in FIG. 4, line 1 shows the absolute time (within one second); line 2 shows the pulse frequency of the absolute time; and line 3 shows the phase deviation between the initial multiframe and the absolute time of the E1 signal for transmission, that is, "tx." After receiving the current absolute time and the phase deviation carried in the idle timeslot, the BS may obtain the relative time when the SDH device sends the initial multiframe according to the phase deviation and current absolute time. After adjusting the time through compensation and synchronizing with the relative time when the SDH device sends the initial multiframe, the BS may need to receive only the multiframes carrying the data from the SDH device.

A system for synchronizing time in the TDM system is also provided in an embodiment of the present disclosure. As shown in FIG. 5, the system may include a sending communication device 51 and a receiving communication device 52.

The sending communication device 51 may be configured to carry the time synchronization information in an idle timeslot and send the timeslot to the receiving communication device 52. The idle timeslot may be in the multiframe of the E1 signal or T1 signal.

The receiving communication device 52 may be configured to receive the time synchronization information carried in the idle timeslot and synchronize with the time according to the time synchronization information.

In an exemplary embodiment, if the time synchronization information sent by the sending communication device 51 may include the current absolute time, the receiving communication device 52 may be configured to perform synchronization according to the current absolute time included in the time synchronization information.

In an exemplary embodiment, if the time synchronization information sent by the sending communication device 51 may include the current absolute time and phase deviation between the initial multiframe and the absolute time, the receiving communication device 52 may be configured to synchronize with the time sent by the sending communication device 51 according to the current absolute time and phase deviation included in the time synchronization information.

In an exemplary embodiment, the sending communication device 51 may be a BITS device and the receiving communication device 52 may be an SDH device; or the sending communication device may be an SDH device and the receiving communication device may be a BS managed by the SDH device.

Figure 6:
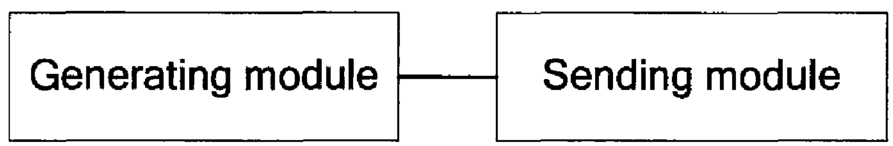
FIG. 6 shows a sending apparatus for synchronizing time in the TDM system in an embodiment of the present disclosure.

FIG. 6 shows a sending apparatus for synchronizing time in the TDM system in an embodiment of the present disclosure. The sending apparatus may include a generating module 61 and a sending module 62.

The generating module 61 may be configured to carry the time synchronization information in an idle timeslot and send the timeslot to the sending module 62. The idle timeslot may be in the multiframe of the E1 signal or T1 signal.

The sending module 62 may be configured to carry the time synchronization information in an idle timeslot and send the timeslot to the receiving communication device 52.

In an exemplary embodiment, the generating module may include a first generating module, configured to carry the phase deviation between the initial multiframe and the absolute time and the current absolute time in an idle timeslot and send the timeslot to the sending module; or the generating module may include a second generating module, configured to carry the absolute time in an idle timeslot and send the timeslot to the sending module.

Figure 7:
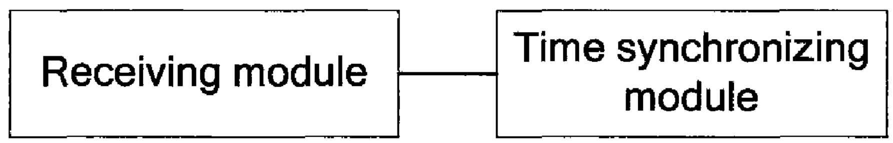
FIG. 7 (A) shows a receiving apparatus for synchronizing time in the TDM system in an embodiment of the present disclosure.
Figure 7:
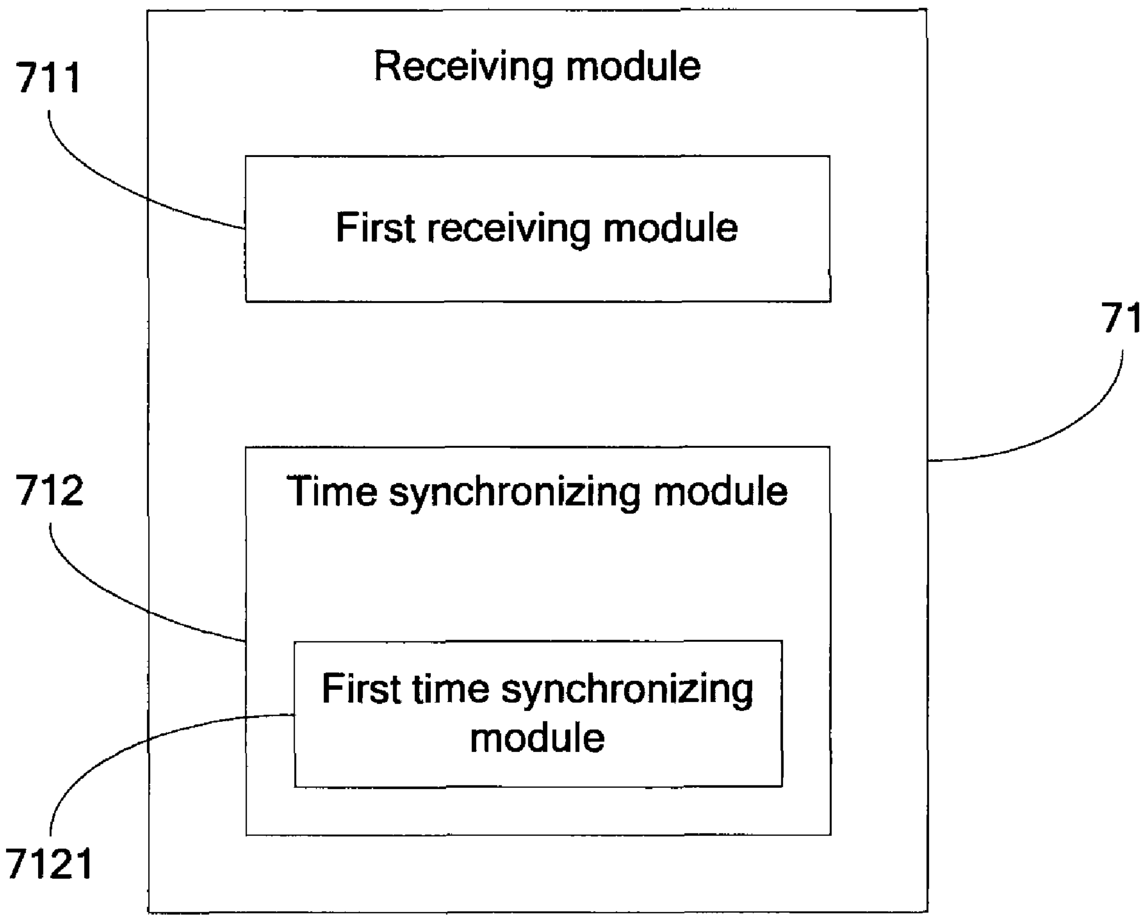
Figure 7C:
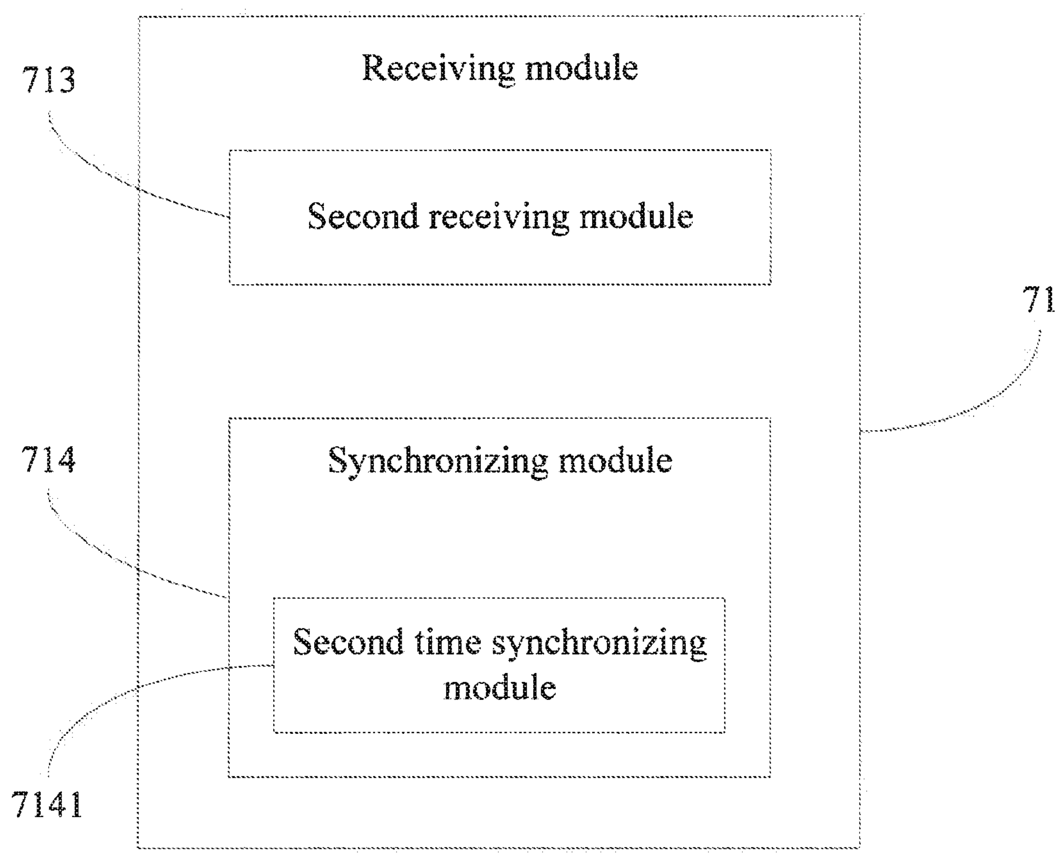

FIG. 7 (A) shows a receiving apparatus for synchronizing time in the TDM system in an embodiment of the present disclosure. The receiving apparatus may include a receiving module 71 and a time synchronizing module 72.

The receiving module 71 may be configured to receive the time synchronization information carried in an idle timeslot from the sending communication device and send the timeslot to the time synchronizing module 72. The idle timeslot may be in the multiframe of the E1 signal or T1 signal.

The time synchronizing module 72 may be configured to synchronize time according to the time synchronization information.

FIG. 7 (B) shows a receiving module of the first implementation mode of the receiving apparatus for synchronizing time in the TDM system in an embodiment of the present disclosure.

In the first implementation mode of this embodiment, the receiving module 71 may include a first receiving module 711 and a time synchronizing module 712, which may include a first time synchronizing module 7121.

The first receiving module 711 may be configured to obtain the phase deviation and current absolute time that are included in the time synchronization information, and send them to the first time synchronizing module 7121.

The first time synchronizing module 7121 may be configured to synchronize with the time sent by the sending communication device according to the current absolute time and the phase deviation.

FIG. 7 (C) shows a receiving module of the second implementation mode of the receiving apparatus for synchronizing time in the TDM system in an embodiment of the present disclosure.

In the second implementation mode of this embodiment, the receiving module 71 may include a second receiving module 713 and a synchronizing module 714, which may include a second time synchronizing module 7141.

The second receiving module 713 may be configured to obtain the current absolute time included in the time synchronization information and send it to the second time synchronizing module 7141.

The second time synchronizing module 7141 may be configured to synchronize time according to the current absolute time.

In an exemplary embodiment, the absolute time in this embodiment may be the Greenwich Mean Time, the absolute time of the Greenwich Mean Time when the initial multiframe arrives, or the like.

According to the method, system and apparatus provided in embodiments of the present invention, unlike the GPS method for synchronizing the time of the communication device in the TDM system in the related art, embodiments of the present invention need to neither set a GPS antenna nor install an apparatus for receiving GPS time signals in the communication device. Thus, embodiments of the present invention save the cost and eliminate the necessity of installation. In addition, the time synchronization will not be affected by the terrain in the area where the communication device is located, which improves the stability of the time synchronization. Further, the receiving communication device obtains the time to be synchronized with the sending communication device according to the phase deviation and time synchronization information, thus guaranteeing the time precision.

Although the present disclosure has been described through some exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed:

1. A method for synchronizing time in a time-division multiplexing (TDM) system, comprising: receiving, by a receiving module of a receiving apparatus, time synchronization information carried in an idle timeslot, wherein the idle timeslot is in a multiframe of an E1 signal or a T1 signal and the time synchronization information comprises a current absolute time and a phase deviation between an initial multiframe and the current absolute time; obtaining, by the receiving module of the receiving apparatus, the current absolute time and the phase deviation from the time synchronization information; sending, by the receiving module of the receiving apparatus, the time synchronization information carried in the idle timeslot to a time synchronizing module of the receiving apparatus; and synchronizing, by the time synchronizing module, time of the time synchronizing module according to the phase deviation and the current absolute time of the time synchronization information carried in the idle timeslot.

2. The method of claim 1, wherein the idle timeslot in the multiframe is timeslot TS0 and the time synchronization information is carried in an idle bit of the timeslot TS0.

3. The method of claim 2, wherein the timeslot TS0 is an odd-numbered timeslot and the idle bit is any one of bit 4 to bit 8 in the timeslot TS0.

4. The method of claim 1, wherein: the synchronizing of the time further comprises synchronizing the time to a sending communication device that sends the current absolute time and the phase deviation.

5. A system for synchronizing time in a time-division multiplexing (TDM) system, comprising: a sending communication device; and a receiving communication device, wherein the sending communication device is configured to carry time synchronization information in an idle timeslot and send the time synchronization information carried in the idle timeslot to the receiving communication device; wherein the idle timeslot is in a multiframe of an E1 signal or a T1 signal and the time synchronization information comprises a current absolute time and a phase deviation between an initial multiframe and the current absolute time; and wherein the receiving communication device includes a receiving module and a time synchronizing module, wherein, the receiving module is configured to receive the time synchronization information carried in the idle timeslot, obtain the phase deviation and the current absolute time comprised in the time synchronization information, and send the phase deviation and the current absolute time to the time synchronizing module, and the time synchronizing module is configured to synchronize time of the time synchronizing module according to the phase deviation and the current absolute time in the time synchronization information.

6. The system of claim 5, wherein: the sending communication device is a building integrated timing supply (BITS) device and the receiving communication device is a synchronous digital hierarchy (SDH) device.

7. The system of claim 5, wherein: the time synchronizing module is configured to synchronize the time to the sending communication device according to the current absolute time and the phase deviation included in the time synchronization information.

8. The system of claim 5, wherein: the sending communication device is an SDH device and the receiving communication device is a base station managed by the SDH device.

9. A receiving apparatus for synchronizing time in a time-division multiplexing (TDM) system, comprising a receiving module and a time synchronizing module, wherein: the receiving module is configured to receive time synchronization information carried in an idle timeslot from a sending communication device, obtain a current absolute time and a phase deviation between an initial multiframe and the current absolute time, and send the time synchronization information to the time synchronizing module, wherein the idle timeslot is in a multiframe of an E1 signal or T1 signal and the time synchronization information comprises the current absolute time and the phase deviation; and the time synchronizing module is configured to synchronize time of the time synchronizing module according to the phase deviation and the current absolute time comprised in the time synchronization information.

10. The apparatus of claim 9, wherein the synchronizing module is further configured to synchronize the time to the sending communication device according to the phase deviation and the current absolute time.

* * * * *